J. HAYES, Jr.
CONCENTRATOR.
APPLICATION FILED APR. 30, 1918.

1,364,991.

Patented Jan. 11, 1921.

Inventor:
John Hayes Jr.,
by his Attorneys,
Howson & Howson

J. HAYES, Jr.
CONCENTRATOR.
APPLICATION FILED APR. 30, 1918.
1,364,991.
Patented Jan. 11, 1921.
2 SHEETS—SHEET 2.
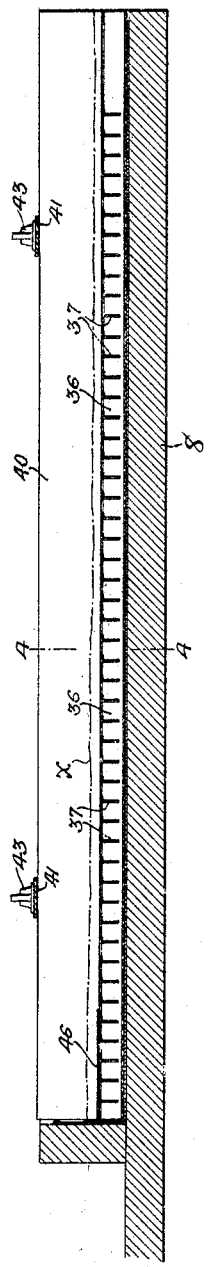
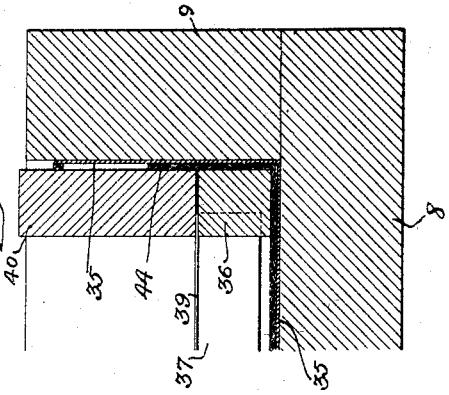
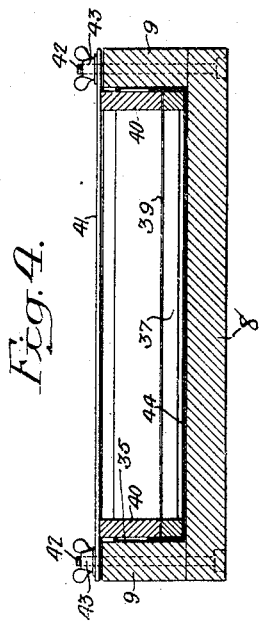
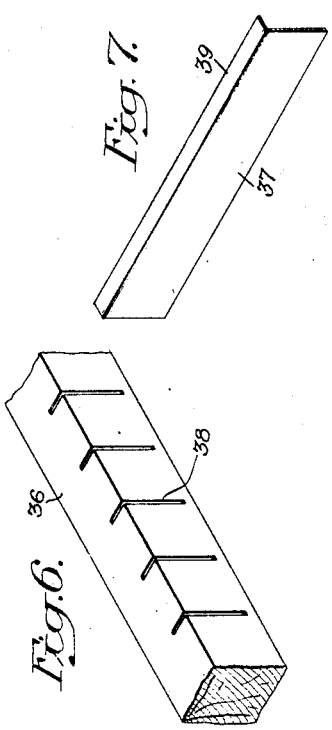
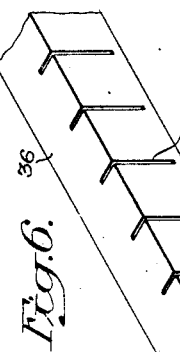
Inventor,
John Hayes Jr,
by his Attorneys,
Howson + Howson

UNITED STATES PATENT OFFICE.

JOHN HAYES, JR., OF PHILADELPHIA, PENNSYLVANIA.

CONCENTRATOR.

1,364,991.          Specification of Letters Patent.      Patented Jan. 11, 1921.

Application filed April 30, 1918. Serial No. 231,682.

*To all whom it may concern:*

Be it known that I, JOHN HAYES, Jr., a citizen of the United States, residing in Philadelphia, Pennsylvania, have invented certain Improvements in Concentrators, of which the following is a specification.

One object of my invention is to provide a simple and substantial device for mechanically separating solid materials of different specific gravities, and more particularly for separating and recovering relatively heavy metals or ores from lighter substances such as sand or other gangue;—the invention contemplating a novel form of container and actuating mechanism therefor whereby such materials are caused to travel in opposite directions, one to a point of discharge and the other to a suitable receiver.

It is further desired to provide a concentrator including a longitudinally jarred container with a novel form of riffle and mounting therefor whereby the valuable material present in the sand or other substance under treatment shall be caused to collect in a definite and more or less isolated part of the apparatus, and which shall be of such construction as to permit certain of its parts being quickly and conveniently removed without danger of loss of any of said material.

Another object of the invention is to provide a concentrator with a novel form of removable container for the riffles and their supporting structures;—the invention also contemplating a novel arrangement of jarring mechanism for the movable element of the apparatus.

These objects and other advantageous ends I attain as hereinafter set forth, reference being had to the accompanying drawings in which, Figures 1 and 2 are respectively a side elevation and a plan of a concentrator constructed in accordance with my invention;

Fig. 3 is a longitudinal vertical section of the riffle box;

Fig. 4 is a transverse section on the line 4—4, Fig. 3;

Fig. 5 is an enlarged fragmentary section of the structure shown in Fig. 4;

Fig. 6 is a perspective view of a portion of one of the riffle-supporting parts;

Fig. 7 is a fragmentary perspective view of one of the riffles; and

Figure 2:
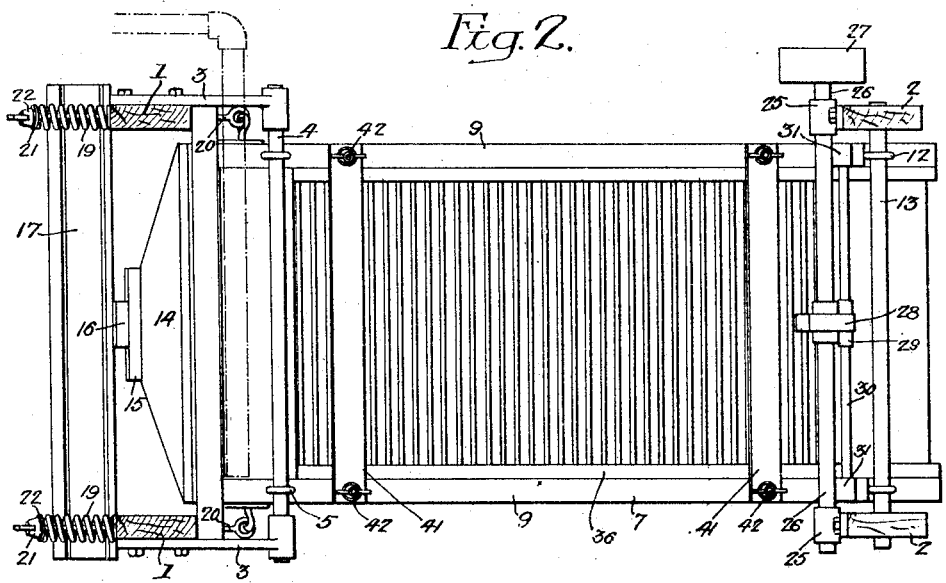
Figure 1:
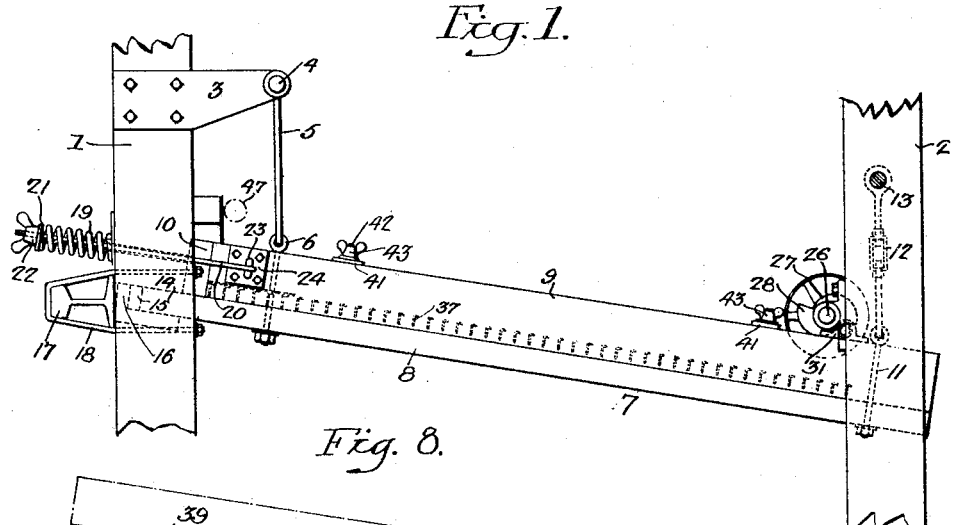
Figure 8:
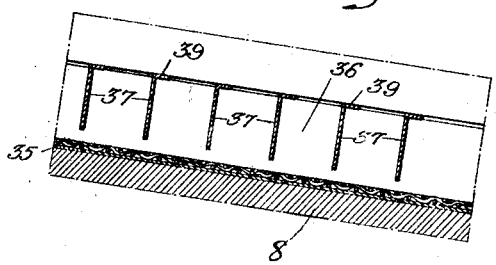
Fig. 8 is a fragmentary vertical section illustrating the detail construction of the upper end of the box and its associated parts.

In the above drawings, 1—1 and 2—2 represent the uprights of the concentrator frame which may be supported and placed in any suitable manner, with which the present invention is not concerned.

The first pair of these uprights supports two horizontally projecting bracket plates 3 having their outer ends connected by a rod 4 on which are hung two depending links 5. The lower ends of these links are respectively connected to or engaged with eye bolts 6 extending vertically through the opposite sides of an elongated relatively shallow box 7.

This latter is made up of a floor or bottom member 8, two side members 9 and an end member 10, and its second or lower end is open. This latter end is provided with a second pair of eye bolts 11 extending through the side members 9 and engaged with the lower ends of a second pair of links 12 hung from a cross bar 13 supported by the uprights 2, these latter links being preferably longitudinally adjustable to permit of an adjustment of the inclination of the box. The arrangement of parts is such that the box 7 is supported in an inclined position with its open end lower than its opposite end which is preferably formed with an extension from its bottom 8 as indicated at 14, and the center of this extension is reinforced by a transverse steel plate 15, on the center of whose outer face is mounted a hard metal block 16 normally resting against or immediately adjacent a transverse abutment or stop formed by a relatively heavy, stiff beam 17 conveniently made of a suitable length of steel rail or other structural section. This is supported by and rigidly fixed to the two uprights 1 by metal strips or other suitable means of connection.

The parts are so proportioned that the box 7 normally hangs with the block 16 immediately adjacent or against the abutment 17, and its movement away from this position is resisted by a pair of springs 19, mounted on rods 20 between the uprights 1 respectively and suitable plates or washers 21, whose position and therefore, the tension of said springs, may be adjusted by suitable means, such as the wing nuts 22 on the outer ends of said bolts or rods 20. The opposite ends of these rods are connected to opposite sides of the upper end of the box 7 by eye bolts 23, in the present instance mounted on plates 24 fixed to the side members 9.

The uprights 2 are provided with a pair of bearings 25 for the reception of a cam shaft 26, which may be driven from a suitable source of power through a pulley 27 and has a cam 28 mounted upon it, preferably at or adjacent a vertical plane passing through the longitudinal center line of the box 7. Said cam is placed to coact with a roller 29 carried by the middle part of a rod or bar 30 extending between the lower opposite ends of the side members 90, to which it is connected by bearings or brackets 31 and is so designed that twice in each revolution it will so act upon the roller 29 and through the rod 30 upon the box 7, as to gradually swing the latter on the cross bars 4 and 13 away from the abutment 17 against the action of the springs 19, thereafter it suddenly releases said roller so as to permit movement of the box in an opposite direction as the springs return to their normal condition.

Mounted within the main containing frame or box 7 is a secondary container 35 preferably made of sheet metal, having the necessary structural strength and like said main box, open at its lower end. Extending along the longitudinal sides of this secondary container are two riffle bars 36, each recessed or notched vertically for the reception of a series of parallel riffles 37 and these are formed of lengths of flat sheet metal having their top edges flanged or bent at right angles toward the lower end of the box. The notches 38 of the riffle bars 36 do not extend vertically through said bars but stop short of the lower faces thereof so that the riffles 37 extend across the inner or auxiliary box 35 about a quarter of an inch above the bottom or floor thereof, although obviously this distance may be varied to suit the material operated on. The riffles preferably have such transverse dimensions that when their lower edges engage the bottoms of the recesses 38, their flanges 39 rest upon the top surfaces of the riffle bars and they are held in this position by two clamping members 40 extending over and parallel with the riffle bars 36 from the top to the bottom end of the box 7.

The height of the members 40 is such that when resting upon the top parts of the riffles, their top edges project slightly above the plane of the sides and end of the main box 7, and they are yieldingly held in this position by a pair of transverse, more or less springy bars 41 of flat metal whose outer ends are perforated for the reception of bolts 42 which extend through the side members 9 of the box 7 and have threaded on their upper ends wing nuts 43 which may be set up to cause them to exert any desired clamping pressure upon the members 40 and hence upon the riffles and riffle bars.

I preferably though not necessarily, mount a sheet of canvas 44 or other suitable material within the auxiliary container 35 so that it projects at the sides and upper end thereof between and under the riffle bars 36 as well as between the clamping members 40 and the side members 9 of the box 7. A flat metal plate 46 is placed over the four or five riffles at the upper end of the box 7 and is clamped in this position by the members 40 so that the material to be treated may be delivered upon it and likewise be prevented from passing into the spaces between said uppermost riffles.

The sand, ore, or other material to be treated may be delivered to the concentrator by any form of conveyer or may be shoveled onto the plate 46 by hand, either previously mixed with a suitable quantity of water or in a dry condition, in which latter case water would be supplied in any suitable manner as through a pipe 48.

Under operating conditions the cam shaft 26 is turned by power applied to the pulley 27, in a typical case at sixty revolutions per minute, and at the same time the sand, ore, etc., is supplied to the upper end of the box 7 upon the plate 46 at such a rate that, with a given inclination of the box, the material remains at all times at a depth sufficient to at least cover the tops of the riffles, as indicated by the dotted line $x$ in Fig. 3. The revolution of the shaft 26, by causing the cam 28 to act on the roller 29, first moves the box longitudinally away from the abutment 17 and thereafter releases it so that the springs 19 become active to suddenly and violently move it toward said abutment, which is struck by the block 16 or the head of the box at the end of this return stroke.

As a result, the box receives a rapid succession of shocks, acting to give the contents a tendency to move toward its upper end and at the same time causing a settling of the heavier particles which it is desired to isolate, so that these shortly rest directly upon the canvas constituting the bottom of the compartment in which the riffles are mounted. In view however, of the relatively high specific gravity of these valuable particles, their tendency to move upward in the box is greater than is that of the sand and other material of lower specific gravity. Owing however to the inclination of the box as well as to the repeated shocks or jarring action, this latter material moves downwardly and is ultimately discharged through the open lower end, while the heavier and valuable particles move upwardly parallel to the plane of said box underneath the lower edges of the riffles. These as shown in Figs. 3 to 5, are elevated above or spaced away from the canvas on the bottom of the secondary container 35 so that said heavier particles finally pass under the plate 46 and accumulate in the spaces between the riffles covered thereby.

The above noted jarring action not only causes the gangue to move downwardly in the box or trough, but owing to the mounting and form of the riffles, causes it to be agitated or circulated in each of the elongated pockets formed by said riffles, whose main portions direct it toward the overhung flanges 39 which deflect it toward the next lower riffle, so that its ultimate discharge is insured and its packing in the pockets is effectually prevented. Such circulation or agitation insures the settling or downward movement of the particles of heavy material and thereafter permits them to move upwardly through the box toward the top thereof.

When it is desired to remove the valuable material which may have accumulated under the plate 46, the rotation of the shaft 26 may be stopped or the box 7 may be held, by suitable means forming no part of this invention, so that the roller 29 is not engaged by the cam 28. The wing nuts 43 are then slackened so as to relieve the pressure on the cross bars 41, after which the inner or secondary box or trough 35 may be drawn out of the lower open end of the box 7 and replaced by another similar box with the riffles, clamping members 40, etc., complete. The wing nuts 43 are then again set up to cause the cross bars 41 to clamp the several parts in position within the main container 7, after which the machine is operated as before.

After the secondary box has been removed, the clamping members 40 are taken out of the sides thereof, thereby permitting removal of the plate 46 and the riffle bars 36 with their riffles, if this be desirable. The gangue in the lower part of the secondary trough may now be removed and the valuable material which has accumulated in the upper part thereof may be taken out by removing the canvas 44 which prevents any possible loss.

With the above described construction and mode of operation I have found it possible to economically concentrate what have hitherto been considered low grade ores and have been uniformly successful in obtaining a larger percentage of values contained in a given ore or sand than could be obtained by other forms of mechanical concentrating apparatus.

I claim:

1. The combination in a concentrator of a box movably supported in a downwardly inclined position; riffles mounted transversely of the box and raised above the bottom thereof; jarring mechanism operative to cause the heavier constituents of material delivered to the box to move upwardly therein under the riffles; and a structure for inclosing certain of the riffles at the upper end of the box to retain the heavier particles collecting therein.

2. The combination in a concentrator of a main box; a secondary box removably mounted therein; a series of transversely extending riffles mounted in said latter box with their lower edges spaced away from the bottom thereof; means for imparting a succession of shocks to the box to cause heavy material to move toward one end thereof and lighter material to move toward the opposite end; and a removable lining within the secondary box.

3. The combination in a concentrator of a main box; a secondary box removably mounted therein; riffles in said secondary box; a frame for retaining said riffles raised above the bottom of the box; a removable lining for the secondary box containing said riffles and riffle frame; with means for imparting a succession of shocks to the box to cause heavy material to move toward one end thereof under the riffles and lighter material to move toward the opposite end.

4. The combination in a concentrator of a frame; a box movably supported thereon in an inclined position; mechanism for moving the box longitudinally toward its lower end and thereafter releasing it; means for moving the box upwardly in an opposite direction; a stop for suddenly arresting the upward movement of the box; riffles extending transversely in the box above the bottom thereof with their top edges extended toward the lower end of the box; means for delivering water to the upper end of the box; and a cover for certain of the riffles at the upper end of the box.

In witness whereof I affix my signature.

JOHN HAYES, Jr.